United States Patent [19]

James

[11] 4,187,930

[45] Feb. 12, 1980

[54] DISPENSING METHOD AND SYSTEM FOR LUBRICATING OIL AND OTHER LIQUIDS

[75] Inventor: Gordon E. James, Rancho Palos Verdes, Calif.

[73] Assignee: TRW Inc., Systems & Energy, Redondo Beach, Calif.

[21] Appl. No.: 900,672

[22] Filed: Apr. 27, 1978

[51] Int. Cl.² .......................... B05C 3/12; F01M 9/00
[52] U.S. Cl. .................... 184/1 R; 118/401; 141/351; 141/392; 222/566
[58] Field of Search ............... 222/207, 566, 571, 440, 222/438, 450, 420, 421, 425, 434; 184/1 R, 1 E, 6, 12, 14; 141/351, 392; 118/401

[56] References Cited

U.S. PATENT DOCUMENTS

| 2,008,564 | 7/1935 | Schumacher | 222/566 X |
| 2,598,908 | 6/1952 | Grimson | 118/401 |
| 2,705,055 | 3/1955 | Matuzas | 184/1 R |
| 2,805,006 | 9/1957 | Henchert | 222/566 |
| 2,941,898 | 6/1960 | Wynn | 118/401 X |
| 3,201,275 | 8/1965 | Herrick | 118/401 X |
| 3,404,025 | 10/1968 | Wootten | 118/401 X |
| 3,522,836 | 8/1970 | King | 118/401 X |
| 3,810,779 | 5/1974 | Pickett et al. | 118/401 X |
| 3,917,120 | 11/1975 | Larenz et al. | 222/456 X |
| 4,043,296 | 8/1977 | Chu et al. | 118/401 X |

Primary Examiner—David H. Brown
Attorney, Agent, or Firm—John J. Connors; Donald R. Nyhagen

[57] ABSTRACT

A liquid is dispensed to a receiving surface by feeding the liquid under pressure to a dispensing orifice surrounded circumferentially by a convex toroidal boundary surface which is non-wettable by the liquid to form a liquid droplet perimetrically contacting the toroidal boundary surface in a manner which resists lateral displacement of the droplet relative to the orifice, and effecting relative movement of the receiving surface past and in wiping contact with the droplet to transfer liquid from the droplet to the receiving surface while regulating the delivery rate of liquid to the orifice to maintain the droplet. The invention is described in the context of roller bearing lubrication.

22 Claims, 11 Drawing Figures

DISPENSING METHOD AND SYSTEM FOR LUBRICATING OIL AND OTHER LIQUIDS

The Government has rights in this invention. Pursuant to Contract (or Grant) No. F04701-74-C-0450, awarded by the Department of the Air Force.

BACKGROUND OF THE INVENTION

This invention relates generally to the fluid handling art and more particularly to a novel commandable liquid dispensing method and system.

As will become evident from the ensuing description, the present liquid dispensing invention is susceptible of a wide range of uses. The currently contemplated use, however, involves lubricating bearings, particularly ball bearings. For this reason, the invention will be described in the context of bearing lubrication but is not intended to be limited to this particular application.

Oil lubricated roller bearings, such as ball bearings, are key elements in a wide variety of rotary systems. Maintenance of a thin, clean, and uniform lubricant film at and near the bearing roller-to-race contact zones and roller-to-retainer pocket interfaces is essential to proper bearing performance in these systems. In some applications, lubricant for this purpose can be provided by passive lubrication. In other applications, it is desirable or necessary to have a commandable oiler to replenish the lubricant when necessary. Positive control of the lubricant quantity can provide a safeguard against premature depletion and thus avoid bearing degradation or failure. A basic design constraint of such an active oiling system is to deliver all of the lubricant in a small metered charge uniformly to the rollers and to the contact zones of the rollers with both the inner and outer races. In most bearings, these regions are not easily accessed. Preferably, the lubrication should be done slowly by a device which is compatible with unmodified bearings and does not introduce contamination.

A vast assortment of roller bearing lubricating systems or oilers have been devised. In a recently reported roller bearing oiler, for example, the lubricant charge is ejected onto one bearing raceway by a single stroke pump immersed in a vented oil reservoir. These existing oilers, however, have numerous disadvantages which need not be discussed here. Suffice it to say a definite need exists for an improved roller bearing oiler.

SUMMARY OF THE INVENTION

According to one of its more limited aspects, this invention provides such an improved lubrication system or oiler for roller bearings, particularly ball bearings. As mentioned earlier and will be evident from the later description, however, the invention is not limited to this particular use. Thus, in its broader aspects, the invention provides a liquid dispensing system for dispensing a liquid which may be virtually any liquid to a receiving means which undergoes relative movement past and in liquid transfer relation to the dispenser as described herein.

In this broader context of the invention, liquid is dispensed to a receiving means through a dispensing orifice in a liquid delivery head. Circumferentially surrounding the open outer end of this orifice is a convex toroidal orifice boundary surface on the head which is non-wettable by the liquid. A liquid delivery system which may be a commandable system feeds liquid to the orifice at a controlled rate. As the liquid emerges from the orifice, it forms a droplet which increases in volume and expands radially, whereby the droplet perimeter eventually contacts the non-wettable toroidal orifice boundary surface. Owing to the relationship between the cohesive forces in the droplet and the adhesive forces between the droplet and the toroidal boundary surface and the arcuate cross-section of this surface, there is produced on the droplet a self-centering action which resists lateral displacement of the droplet relative to the orifice.

If liquid continues to feed to the dispensing orifice without transfer of liquid from the delivery head to the liquid receiving means, the droplet on the head will continue to expand while remaining relatively stable on the head until the external forces, such as gravity, on the droplet overcome the cohesive forces in and the adhesive forces on the droplet. At this point, the droplet becomes unstable and runs from the orifice, a condition referred to herein as flooding. The distance of projection of the stable droplet beyond the delivery head along the orifice axis is referred to as the height of the droplet. The height of the largest stable droplet is the maximum droplet height.

According to the present invention, the liquid delivery head is located relative to the liquid receiving means in a manner such the spacing, referred to herein as the standoff distance, between the head and the surface of the receiving means which is to receive liquid from the head is less than the maximum height of the stable liquid droplet on the head. During relative movement of the receiving means with respect to the delivery head, therefore, the receiving means moves past and in wiping contact with the droplet to effect liquid transfer from the droplet to the receiving means. The rate of liquid delivery to the dispensing orifice is regulated to maintain the proper droplet size for effective liquid transfer. The standoff distance of the receiving surface is made sufficiently less than the maximum droplet height that the earlier discussed droplet self-centering action provided by the toroidal boundary surface on the delivery head will resist lateral displacement of the droplet and resultant possible flooding of the head due to the lateral viscous shearing loads exerted on the droplet by the liquid receiving means.

The particular liquid dispensing system described is a ball bearing lubricating or oiling system. The oil delivery head is located relative to the ball bearing to be lubricated in such a way that the bearing balls rotate past and in wiping contact with the oil droplet on the delivery head. Oil transfer from the droplet to the bearing thus occurs intermittently as the successive bearing balls contact the oil droplet. The oil delivery means of this bearing lubrication system is commandable to periodically deliver, at any desired repetition rate, a measured volume of oil to delivery head dispensing orifice.

DESCRIPTION OF THE PREFERRED EMBODIMENTS

Figure 1:
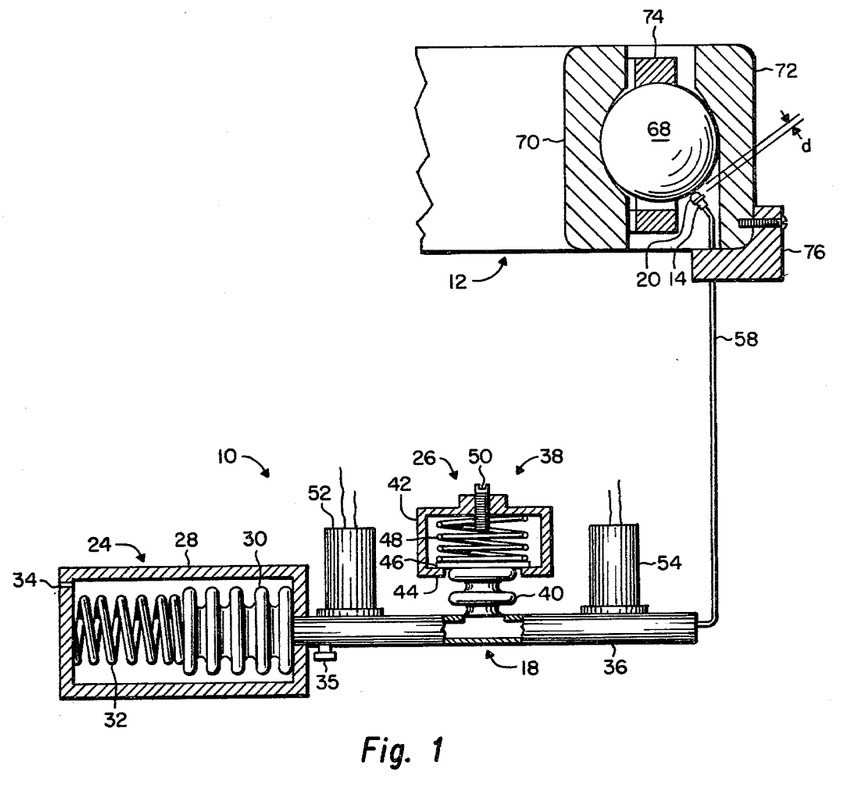
FIG. 1 diagrammatically illustrates a liquid dispensing system, in this case a ball bearing oiling system, according to the invention.

Referring to the drawings, a liquid dispensing system 10 according to the invention is shown dispensing liquid to a liquid receiving means 12. The dispensing system 10 has a liquid delivery head 14 containing a liquid dispensing orifice 16 and liquid delivery means 18 for feeding liquid under pressure to the orifice to form a liquid droplet 20 at the open outer end of the orifice. The delivery head 14 and liquid receiving means 12 undergo relative movement in a manner such that the relative movement of the receiving means with respect to the head occurs past and in wiping contact with the liquid droplet 20 to effect liquid transfer from the droplet to the receiving means. The liquid delivery means is commandable or controllable to deliver liquid to the dispensing orifice 16 at the proper rate to maintain the liquid droplet 20 in the proper size and configuration for effective liquid transfer to the receiving means 12. A major contribution of the invention resides in a convex toroidal boundary surface 22 on head 14 surrounding the open outer end of the orifice 16. This boundary surface is non-wettable by the liquid being dispensed and cooperates with the droplet 20 to resist displacement of the droplet laterally of the orifice.

A variety of liquid delivery means 18 may be utilized in the liquid dispensing system 10. The particular delivery means shown in a remotely commandable delivery system including a liquid storage means 24 and selectively operable means 26 for effecting periodic delivery of a measured volume of the liquid from the storage means to the liquid dispensing orifice 16. The repetition rate of the liquid delivery cycle may be varied to regulate the effective liquid delivery rate to the orifice.

The illustrated liquid storage means 24 comprises a housing 28 containing a liquid reservoir 30, in this instance a bellows, which is expandable to receive liquid to be dispensed and collapsible to expel liquid from the reservoir. Acting between the reservoir 30 and the housing 28 is a compression spring 32 which is biased to collapse and thereby expel liquid from the reservoir. The housing 28 may be vented at 34 to permit expansion of the reservoir 30 through the housing during filling of the reservoir with liquid through a removable capped fitting 35.

The illustrated selectively operable liquid delivery means 26 comprises a liquid delivery conduit 36 sealed at one end to the liquid reservoir or bellows 30 opposite the spring 32. The opposite end of the delivery conduit connects to the liquid delivery head 14 and opens to the inner end of the liquid dispensing orifice 16. Between the reservoir and orifice is an adjustable liquid metering means 38 comprising, in this instance, a bellows 40 opening at one end to the passage in and sealed to the delivery conduit 36. The opposite closed end of the metering bellows 40 projects into a fixed housing 42 having an internal flange 44 forming a limit stop surrounding the latter bellows end. A plate 46 rigidly joined to the closed end of the bellows 40 projects radially beyond the bellows to form a stop shoulder which is engaged with the housing limit stop 44 to limit contraction of the bellows. The metering bellows is said to be fully contracted when its stop shoulder 46 engages the housing limit stop 44. A spring 48 acting between the housing 42 and the metering bellows 40 urges the latter to this fully contracted configuration. The spring 48 may be replaced by the elasticity of the metering bellows itself, if desired. Expansion of the bellows is adjustably limited by an adjustable limit stop 50 in the form of a stop screw threaded in the housing 42.

Between the liquid metering means 38 and the liquid storage means 24 is a normally closed liquid supply valve 52, preferably a remotely operable solenoid valve. Between the orifice 16 and the metering means 38 is a delivery valve 54, also preferably a remotely operable solenoid valve. When supply valve 52 is opened and delivery valve 54 is closed, liquid is expelled from the reservoir 30 by the reservoir spring 32 to the metering bellows 40, thereby expanding and filling this bellows to the limit permitted by the current setting of the adjustable metering limit stop or set screw 50. When the valve 52 is reclosed and valve 54 is opened, liquid is expelled from the metering bellows 40 to the dispensing orifice by the metering bellows spring 48.

It will now be understood that the liquid delivery means 26 may be operated to periodically deliver to the dispensing orifice 16 metered volumes or charges of liquid by periodically operating the supply and delivery valves 52, 54 in the manner described at such a frequency that the metering bellows 40 is initially filled to its maximum capacity as determined by the current setting of the adjustable bellows limit stop 50 and then emptied to its minimum capacity as determined by the fixed bellows limit stop 44 by expulsion of liquid from the bellows to the orifice. The volume of each such metered liquid charge may be adjusted by adjusting the limit stop 50. The flow rate of each liquid charge from the metering bellows 40 to the dispensing orifice 16 is determined by the flow resistance of the passage to and through the orifice and the spring rate of the metering bellows spring 48. The frequency at which the metered liquid charges are delivered to the dispensing orifice is determined by the frequency of the above liquid delivery cycle and may be such that the orifice receives liquid charges at periodic intervals. Alternatively, the frequency of this delivery cycle may be greater than that which permits total liquid expulsion from the metering bellows 40 during each delivery cycle. In this case, a relatively constant flow of liquid will be maintained to the dispensing orifice 16. In any event, the liquid flow rate to the dispensing orifice is regulated to maintain the liquid droplet 20 at the orifice.

A major contribution of the invention resides in the convex toroidal boundary surface 22 of the dispensing orifice 16 which serves to resist lateral displacement of the liquid droplet 20 relative to the orifice and thereby retain the droplet in the proper location on the delivery head 14 and in the proper size and configuration for liquid transfer from the droplet to the liquid receiving means 12 in the manner explained below. The action of this orifice boundary surface will now be explained by reference to FIGS. 2 and 3.

Figure 2:
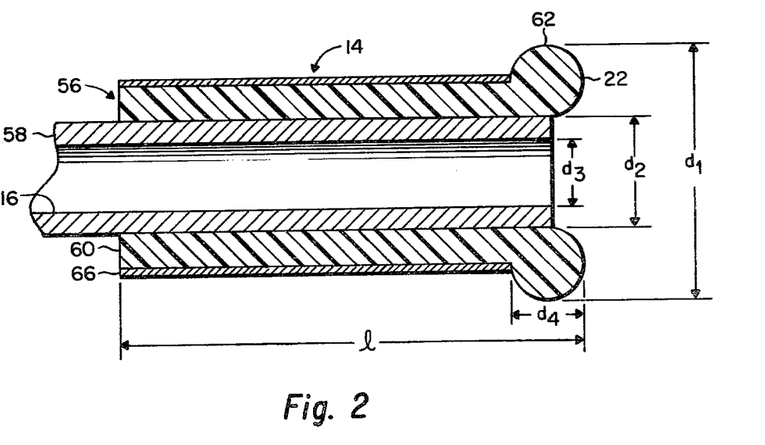
FIG. 2 is an enlarged axial cross-section through the delivery head of the oiling system.
Figure 3:
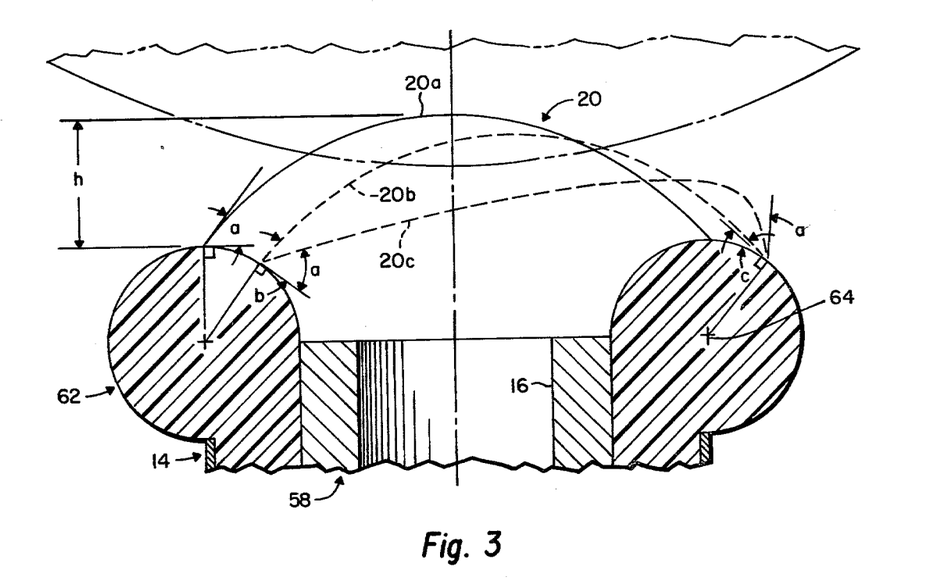
FIG. 3 is a further enlarged section through the tip of the delivery head.

FIGS. 2 and 3 illustrate the liquid delivery head 14 of the liquid dispensing system 10 on enlarged scale. This particular liquid delivery head comprises a sleeve 56 mounted on one end of a liquid delivery tube 58, the passage in which opens through the tube end to form the dispensing orifice 16. The opposite end of this tube connects to the liquid delivery conduit 36, whereby liquid flow from the liquid reservoir 30 to the dispensing orifice 16 occurs through the delivery conduit to the delivery tube and then through this tube to the orifice.

Sleeve 56 has a rear cylindrical sleeve portion or shank 60 surrounding the orifice end of the delivery tube 58 and a forward toroidal tip 62 projecting in bead-like fashion axially beyond the end of the delivery tube and radially beyond the rear cylindrical sleeve shank. The surface of this toroidal tip or toroid as it will be called, constitutes the toroidal orifice boundary surface 22 referred to earlier. The particular toroid shown is a torus whose circular centerline 64 lies approximately in the plane of the end of the delivery tube 58. The radially inner perimeter of the torus surface 22 merges tangentially with the inner cylindrical surface of the sleeve shank 60. The radially outer perimeter of the torus surface joins the outer cylindrical surface of the shank at almost a right angle.

It is worthwhile to note here that while the illustrated delivery head is a sleeve fitted on the end of a liquid delivery tube which forms the liquid dispensing orifice, it will be evident from the following description that the dispensing orifice may be formed directly in the sleeve itself. Also, the toroid 62 of the delivery head may have any convex toroidal shape and is not required to be a torus, as shown. As mentioned, the orifice boundary surface 22 of the toroid is non-wettable by the liquid to be dispensed. This may be accomplished by making the entire delivery head of a material which is non-wettable by the liquid or simply providing the head with a surface coating which is non-wettable by the liquid. In a presently contemplated bearing oiling application, for example, in which the liquid is a high surface energy lubricating oil such as APIEZON C oil, the delivery head sleeve 56 may be constructed of or coated with TEFLON plastic.

Consider now the delivery head geometry as it is shown in FIG. 3. In this figure, the solid line 20a represents a stable liquid droplet 20 which has been formed by feeding liquid to the dispensing orifice 16 and is disposed in centered relation to the orifice with the outer perimeter of the droplet contacting the toroidal orifice boundary surface 22. As will be obvious to those versed in this art, in a theoretical solid/liquid system of the kind shown, assuming the boundary surface 22 is totally smooth, the outer free surface of the droplet 20a conforms to a spherical surface, the contact angle a between the droplet and the boundary surface 22 is uniform about the full 360° of the droplet perimeter, and is determined by the cohesive strength of the liquid relative to the adhesive strength of the bond between the liquid and the boundary surface 22, and the internal liquid pressure within the droplet is uniform throughout the droplet. According to this invention, the boundary surface 22 is selected to be non-wettable by the liquid to be dispersed. The contact angle a is thus an acute angle. In the case of APIEZON C oil as the liquid and polished TEFLON as the boundary surface 22, the contact angle a is 52.5°.

Assume now that the liquid droplet is somehow displaced laterally of the dispensing orifice 16 from the centered droplet position 20a to the offset position shown in broken lines 20b without changing the droplet shape i.e. the free surface spherical configuration of the droplet. Assume further the absence of gravity of any other external body force tending to displace the droplet laterally of the orifice and that for the particular liquid and orifice boundary surface 22 of concern, the stable contact angle between the liquid and surface is the contact angle a shown in full lines in FIG. 3. Under the conditions specified, the contact angle b at the left side of the displaced droplet 20b would be greater than the stable contact angle a. The contact angle c at the right side of the displaced droplet 20b would less than the stable contact angle a. Around the remaining droplet perimeter, the contact angle would vary progressively between b and c. Since it is impossible for the illustrated liquid/solid system to exist in stable equilibrium with other than a uniform contact angle a about the full perimeter of the droplet 20b, the latter must deform to attain this uniform contact angle if the droplet is to remain displaced as shown. The deformed droplet state would conform to that shown in broken lines 20c in FIG. 3.

In this deformed state, the droplet surface would have a smaller radius of curvature at its right hand side than at its left side, and the droplet surface curvature would vary progressively between these extremes along the remaining droplet sides. Such a deformed droplet configuration, however, would tend to produce relatively high internal liquid pressure at the right side of the droplet where the smaller surface curvature exists and a relatively low internal liquid pressure at the left side of the droplet where the larger surface curvature exists. In the assumed absence of any external body force on the droplet for balancing the resulting pressure difference, a net liquid flow to the left (and in all other radial directions of liquid pressure unbalance) would occur to restore the internal liquid pressure balance. This liquid flow, in turn, would restore the droplet to its centered stable configuration 20a, wherein the stable contact angle a exists about the full circumference of the droplet.

It is evident from the preceding discussion that the illustrated delivery head configuration with its toroidal orifice boundary surface 22 provides a self-centering action which tends to resist lateral displacement of the liquid droplet 20 from its centered position relative to the dispensing orifice. Accordingly, if the system is devoid of any external body forces on the droplet acting laterally of the orifice, the droplet will assume its centered configuration of FIG. 3. Assume now that a lateral body force does act on the droplet, such a gravity with the dispensing orifice 16 in a horizontal attitude. In this case, the droplet will deform downwardly until the restoring or self-centering force produced by the orifice boundary surface 22 balances the gravitational force on the droplet. In either case, that is whether or not the droplet 20 is subjected to a body force laterally of the dispensing orifice 16, if liquid continues to feed to the orifice without equal net transfer of liquid from the droplet to the liquid receiving means 12, the droplet will continue to grow in size until it overflows or floods the delivery head 14, as discussed below in connection with FIGS. 4a–4g.

As noted earlier, the distance h in FIG. 3 of projection of the droplet 20 beyond the delivery head 14 axially of the dispensing orifice 16 is termed the height of the droplet. The maximum droplet height h is the height of the largest stable droplet which may be formed on the delivery head in normal operation of the liquid dispensing system, i.e. the largest droplet which may be formed without overflowing or flooding the head when the droplet is subjected to the largest body force it will encounter in actual system operation.

Essentially the same forces which resist lateral displacement of the active droplet 20 at the front end of the delivery head 12 are also effective on any stray liquid which collects on the delivery head shank 60 and serve to inhibit or prevent contact between this stray liquid and the active droplet. If such liquid contact does occur, the active droplet 20 will flow rearwardly onto the delivery head shank, i.e. liquid will flow from the active droplet to the shank. This condition of the system is referred to as short-circuiting in that liquid flows from the dispensing orifice 16 to the delivery head shank 60 rather than to the liquid receiving means 12 and causes flooding of delivery head.

In connection with this short-circuit inhibiting action of the rear delivery head geometry, it is evident that the rear side of the delivery head toroid 62 provides a toroidal boundary surface, hereafter referred to as a rear boundary surface, about the delivery head shank similar to the front toroidal boundary surface 22 about the dispensing orifice 16. Unlike the front toroidal boundary surface, however, which bounds the entire perimeter and hence opposing sides of the front active droplet and thus provides a self-centering action on the droplet, the rear toroidal boundary surface bounds only the front end of the delivery head shank 60 and hence only the front perimeter of any stray liquid on the shank. Accordingly, contact of stray liquid on the shank with the rear toroidal boundary surface creates a rearward pressure unbalance on the stray liquid which resists forward flow of the liquid about the toroid 62 into short-circuiting contact with the active front droplet 20. According to the preferred practice of the invention, the delivery head shank 60 is provided with a surface 66 which is wettable by the liquid to be dispensed to promote rearward flow of stray liquid away from the front toroid 62. The shank surface 66, which may be steel in the case of APIEZON C oil, may comprise a sleeve on the delivery head, as shown.

Figure 4A:
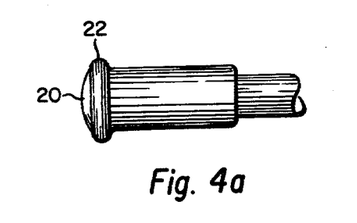
FIGS. 4a–4g illustrate successive stages in the growth of an oil droplet on the delivery head.
Figure 4B:
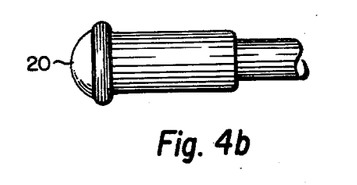
Figure 4C:
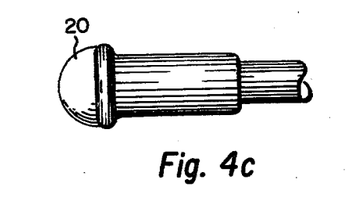
Figure 4D:
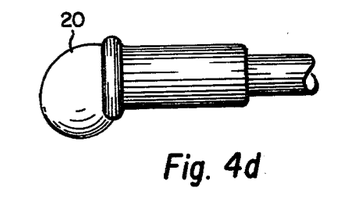
Figure 4E:
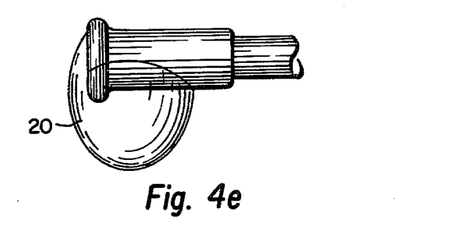
Figure 4F:
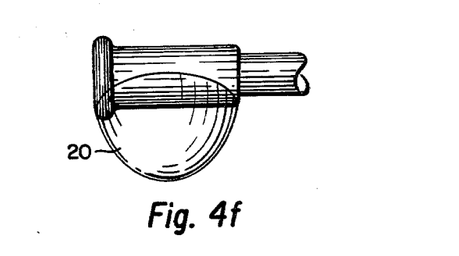
Figure 4G:
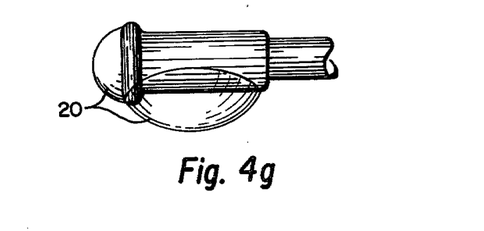
Figure 5:
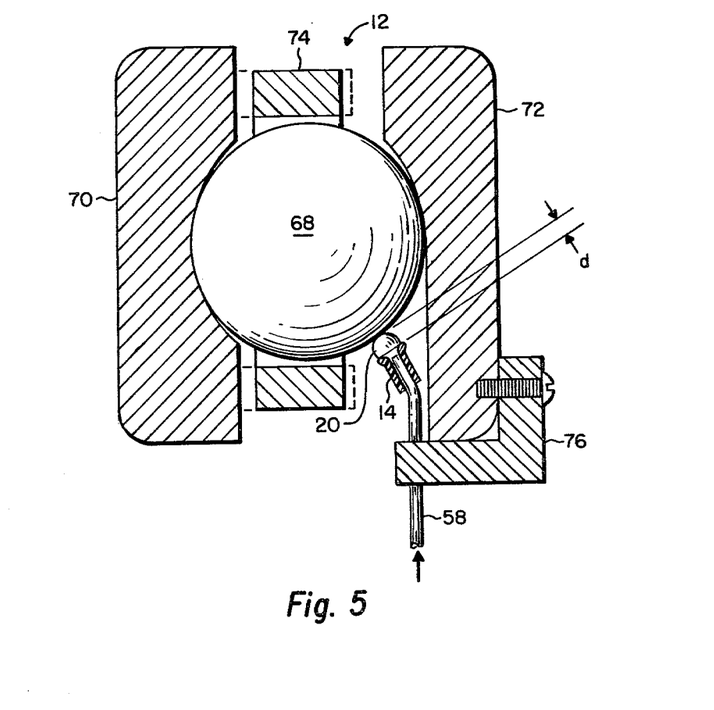
FIG. 5 is an enlarged section through the bearing being oiled, showing the oil delivery head of the oil dispensing or lubricating system.

Attention is now directed to FIG. 4a–4g which illustrate successive stages of actual active droplet growth on a test liquid delivery head according to the invention having a torous 62 bounding the dispensing orifice 16 and which is disposed in a worst case attitude wherein its orifice is horizontal such that gravity loads the forming droplet 20 normal to the axis of the orifice. The liquid involved in the test was APIEZON C oil and the entire delivery head including its orifice boundary torus and shank was constructed of TEFLON so no advantage was taken by using a steel shank 60 to eliminate flooding. FIGS. 4a–4d show progressive growth stages with each stage being in stable equilibrium with gravity. FIG. 4e shows the droplet after slight additional growth overflowing back onto the shank. In FIG. 4d, the weight of the droplet nearly exceeds the partial derivative of the total system surface energy with respect to a lateral (downward) droplet movement. FIG. 4f is the end result of the overflow condition in FIG. 4e. In FIG. 4f, the hanging droplet is covering the lower edge of the delivery head torus 62 and is in contact with the effluent from the delivery tube. In this condition, no front active droplet formation can take place until the flooding is reduced by drainage of the head to the condition shown in FIG. 4g. In FIG. 4g, the torus 62 is effectively separating the flooded region on the delivery head shank 60 from the forming front active droplet 20, whereby the normal growth pattern of FIG. 4a–4d can occur. FIG. 4d illustrates the maximum stable active droplet size and hence maximum droplet height h for the particular dispensing system tested. The critical dimensions (FIG. 2) of the delivery head 14 used in the test are as follows:

$l = 0.128'$
$d_1 = 0.07'$
$d_2 = 0.032'$
$d_3 = 0.02'$
$d_4 = 0.019'$

The delivery tube for conducting the oil to the delivery head was stainless steel.

From the description to this point of the liquid dispensing system 10, it will be understood that the delivery head 14 is supplied with liquid to be dispensed from the liquid storage means 24 by just closing the delivery valve 54 and opening the supply valve 52 to effect liquid expression from the liquid reservoir 30 into the metering bellows 40. This metering bellows is thereby charged or filled with liquid to the maximum capacity permitted by the current setting of the metering adjustment screw 50. The supply valve 52 is then closed and the delivery valve 54 is opened to effect expulsion of liquid from the metering bellows 40 to delivery head 14. The liquid thus supplied to the delivery head flows through the dispensing orifice 16 to form at the front end of the orifice the liquid droplet 20 from which liquid is transferred to the liquid receiving means 12 in the manner explained below. The toroidal orifice boundary surface 22 provides on the droplet a self-centering action which resists lateral displacement of the droplet from the orifice to retain the droplet in the proper position and configuration for liquid transfer to the receiving means.

According to the present invention liquid is transferred from the droplet 20 to the liquid receiving means 12 by effecting relative movement between the delivery head 14 and the receiving means in a manner such that the relative movement of the receiving means with respect to the head occurs along a path transverse to the dispensing orifice 16 and spaced from the head a standoff distance less than the maximum height of the droplet. The path thus intersects the droplet so that the receiving means undergoes relative movement past the head in wiping contact with the droplet. As explained in some detail below, this wiping contact occurs in such a way that liquid is transferred from the droplet to the receiving means. The rate of liquid flow to the delivery head 14 is regulated to maintain the proper droplet size.

As mentioned earlier and will now be evident to those versed in this art, the present liquid dispensing system may be utilized to dispense virturally any liquid to any compatible liquid receiving means. The drawings illustrate a presently useful application involving lubrication of a ball bearing with a lubricating oil such as APIEZON C oil. In the drawings, then, the liquid receiving means 12 is a ball bearing unit.

Except for the present lubricating or oiling means, the ball bearing 12 is conventional and hence need not be described in elaborate detail. Suffice it to say that the bearing comprises (FIG. 1) a circular row of bearing balls 68 between inner and outer bearing races 70, 72 and caged by a ball retainer 74. According to the present invention, the liquid or, in this particular application oil, delivery head 14 is mounted between the bearing races 70, 72 with the delivery head orifice 16 opening toward the circular row of bearing balls. The delivery head may be mounted in any convenient way and in this case is mounted by a bracket 76 which is joined in any suitable manner to the outer bearing race 72. The standoff distance d between the surface envelope of the circular row of balls 68 and the delivery head 14 is made less than the maximum stable height h of the oil droplet 20 on the delivery head such that during operation of the bearing 12 to support a rotary load, the bearing balls 68 rotate in succession past and in wiping contact with the oil droplet. Oil is thereby transferred from the droplet to each bearing ball. The rate of oil delivery to the delivery head is regulated to maintain an oil droplet 20 of the proper size to attain the desired oil transfer to the bearing balls.

The oil transfer phenomena was studied in a bearing spindle test setup using a strobe light to view the oil transfer. At low bearing speeds, a large area of the delivery head droplet was contacted and deformed as each ball passed. At high bearing speeds for the same oil flow rate, a much smaller droplet area contacted the ball. At 700 rpm, for low flow rates, the delivery head droplet was essentially spherical with a narrow stream of droplets eminating like an electric discharge from the tip where the balls made contact with the droplet. The main droplet did not transfer in total to a ball under any conditions except for near-zero speeds. Also, the oil was never in free flight between the delivery head and the balls but rather was always attached to one of the head or ball surfaces. In this test, the balls were definitely each individually lubricated, without loss or splatter from the delivery head. Observation of transferred droplets on the ball surfaces using the strobe light also indicated that the bulk oil did not spiral outward toward the bearing races, but rather appeared to transfer to the retainer ball pockets and from there to the races. Both races received lubricant.

A test was also performed in which the bearing was filled with oil beyond capacity by using the oiler at a high flow rate for a long period. Under these conditions the ball pockets were flooded and bulk oil was seen to be oribiting on the balls. The bulk oil interrupted normal oil transfer from the delivery head 14 to the bearing by buffeting the delivery head droplet. Occasionally the droplet would be completely knocked off the head onto the shank of the delivery head in the flooding mode. This was the only case where delivery head flooding occurred while the bearing was running, however. Obviously such flooding may be avoided by properly regulating the oil flow rate to the delivery head. As noted earlier, this flow rate regulations is accomplished by regulating the rate at which the valves 52, 54 are operated and/or adjusting the metering screw 50 to regulate the maximum capacity of the metering bellows 40. As an additional safeguard against the flooding condition just described, the bearing-ball-to-delivery-head standoff distance d can be reduced to enable the droplet to be reduced to a more stable size. The test setup, for example, a standoff distance d of 0.020 inches was found to be satsifactory.

Uniformity of oil delivery rate to each bearing ball was studied for a range of bearing speeds and oil delivery rates. The strobe light was used to illuminate each ball as it passed the delivery head. Non-uniformity of oil delivery, if it occurred, would show up as jitter in the delivered droplet size. The oil delivery was surprisingly smooth, however, and indicated uniformity for all but the above delivery head flooded condition. It might be assumed that the ball getting the most oil would grow faster in diameter and thus pull off increasingly large quantities of oil from the delivery head droplet. This did not occur, however, since apparently the transfer from each ball to its retainer pocket and the bearing races at least equals the delivery rate to the bearing so oil does not build up on any one ball preferentially.

What is claimed is:

1. Liquid delivery means for a liquid dispensing system, comprising:
    a liquid delivery head containing a liquid dispensing orifice opening at one end through the front end of said head,
    a convex toroidal formation at said front end of said head about and having a toroidal surface circumferentially bounding said one end of said orifice,
    said orifice being adapted to be supplied with a liquid to be dispensed in a manner to form at said one end of said orifice a liquid droplet perimetrically contacting said toroidal surface, and
    said toroidal surface being non-wettable by said liquid whereby said droplet and toroidal surface coact to produce on said droplet a self-centering action which resists displacement of said droplet laterally of said orifice.
2. The liquid delivery means of claim 1, wherein:
    said toroidal formation is torus shaped and said toroidal surface is circularly curved in transverse cross-section.
3. The liquid delivery means of claim 1, wherein:
    said delivery head has a rear shank,
    said toroidal formation projects laterally beyond said shank and has a rear toroidal surface intersecting the surface of and facing rearwardly along said shank, and
    said rear toroidal surface is non-wettable by the liquid to be dispensed, whereby said rear surface coacts with stray liquid on said shank to resist contact of said stray liquid with said liquid droplet.
4. The liquid delivery means of claim 3, wherein:
    said shank surface is wettable by the liquid to be dispensed to promote rearward migration of stray liquid from the shank.
5. The liquid delivery means of claim 4, wherein:
    said toroidal formation is torous shaped and said toroidal surfaces are circularly curved in transverse cross-section.
6. Oil delivery means for a bearing lubricating system, comprising:
    a sleeve-like oil delivery head containing an oil dispensing orifice extending axially through and opening at one end through the front end of said head for delivering oil to the bearing to be lubricated,
    said head having a convex toroidal formation at the front end of said head and a rear shank behind said toroidal formation, and said toroidal formation projecting laterally beyond said shank,
    said toroidal formation having a front toroidal surface circumferentially bounding said one end of said orifice and a rear toroidal surface intersecting the surface of a facing rearwardly along said delivery head shank,
    said toroidal surfaces being non-wettable by the oil to be used for lubrication, and
    said shank surface being wettable by said oil.
7. The oil delivery means of claim 6, wherein:
    said toroidal formation is torous shaped and said toroidal surfaces are circularly curved in transverse cross-section.
8. A liquid dispensing system comprising:
    a liquid delivery head containing a liquid dispensing orifice opening at one end through the front end of said head,
    a convex toroidal formation at said front end of said head about and having a toroidal surface circumferentially bounding said one end of said orifice, liquid delivery means for supplying liquid to be dispensed to said orifice to form at said one end of the orifice a liquid droplet perimetrically contacting said toroidal surface, and said toroidal surface being non-wettable by said liquid, whereby said droplet and toroidal surface coact to produce on said droplet a self-centering action which resists displacement of said droplet laterally of said orifice.

9. The liquid dispensing system and claim 8, wherein:

said liquid delivery means includes means for regulating the flow rate of liquid to said delivery head.

10. The liquid dispensing system of claim 8 wherein:

said liquid delivery means comprises a liquid reservoir, a liquid metering bellows between said reservoir and delivery head for containing a predetermined volume of liquid, means for feeding liquid from said reservoir to said metering bellows to fill said bellows with said predetermined volume of liquid, and means for feeding the liquid from said metering bellows to said delivery head.

11. The liquid dispenser of claim 10 including:

means for regulating the predetermined volume of liquid which said metering bellows will contain.

12. The liquid dispensing system of claim 8, wherein:

said delivery head has a rear shank, said toroidal formation projects laterally beyond said shank and has a rear toroidal surface intersecting the surface of and facing rearwardly along said shank, and said rear toroidal surface is non-wettable by the liquid to be dispensed, whereby said rear surface coacts with stray liquid on said shank to resist contact of said stray liquid with said liquid droplet.

13. The liquid dispensing system of claim 12, wherein:

said delivery head shank surface is wettable by the liquid to be dispensed to promote rearward migration of stray liquid from said shank.

14. A bearing lubricating system, comprising:

a sleeve-like oil delivery head containing an oil dispensing orifice extending axially through and opening at one end through the front end of said head for delivering oil to the bearing to be lubricated, said head having a convex toroidal formation at the front end of said head and a rear shank behind said toroidal formation, and said toroidal formation projecting laterally beyond said shank, said toroidal formation having a front toroidal surface circumferentially bounding said one end of said orifice and a rear toroidal surface intersecting the surface of a facing rearwardly along said delivery head shank, said shank surface being wettable by said oil oil delivery means for supplying oil to said orifice to form at said one end of the orifice an oil droplet perimatrically contacting said front toroidal surface and projecting beyond said toroidal surface in the axial direction of said orifice for oil transfer from said droplet to a bearing to be lubricated, said front toroidal surface being non-wettable by said oil whereby said oil droplet and front toroidal surface coact to produce on said droplet a self-centering action which resists displacement of said droplet laterally of said orifice, said rear toroidal surface being non-wettable by said oil whereby said rear toroidal surface coacts with stray oil on said delivery head shank to resist contact of said stray oil with said oil droplet, and said delivery head shank surface being wettable by said oil to promote rearward migration of stray oil from said shank.

15. In combination:

a liquid dispensing system including a liquid delivery head containing a liquid dispensing orifice opening at one end through the front end of said head, a convex toroidal formation at said front end of said head about and having a toroidal surface circumferentially bounding said one end of said orifice, means for supplying liquid to said delivery head at a regulated rate to form at said one end of said orifice a liquid droplet perimetrically contacting said toroidal surface and projecting a given height beyond said surface axially of said orifice, and said toroidal surface being non-wettable by said liquid, whereby said droplet and toroidal surface coact to produce on said droplet a self-centering action which resists displacement of said droplet laterally of said orifice, liquid receiving means for receiving liquid from said dispensing system by liquid transfer from said droplet, and said delivery head and receiving means being movable relative to one another in a manner such that the relative movement of said receiving means with respect to said head occurs along a path transverse to the axis of said orifice and spaced from said head a standoff distance less than said given droplet height, whereby said receiving means undergoes relative motion past and in wiping contact with said droplet to effect liquid transfer from said droplet to said receiving means.

16. The combination of claim 15, wherein:

said receiving means is a bearing having two relatively movable bearing members, and bearing means between said members mutually supporting the members for relative movement, and said liquid is lubricating oil.

17. The combination of claim 15, wherein:

said receiving means is a rotary bearing having relatively rotatable bearing members and a circular row of bearing rollers between said bearing members supporting the members for relative rotation, said bearing rollers undergo bodily rotational movement along a circular path coincident with said row during relative rotation of said bearing members, said liquid is lubricating oil, and said delivery head is mounted in a radial position relative to said circular path with a standoff distance between said head and circular path less than said given droplet height whereby said bearing rollers undergo relative rotation in succession along said circular path past and in wiping contact with said oil droplet to effect oil transfer from said droplet to each roller.

18. The combination of claim 17 wherein:

said bearing is a ball bearing, said bearing members are radially inner and outer circular bearing races, and said bearing rollers are bearing balls.

19. The combination of claim 15, wherein:

said delivery head has a rear shank, said toroidal formation projects laterally beyond said shank and has a rear toroidal surface intersecting the surface of and facing rearwardly along said shank, and said rear toroidal surface is non-wettable by the liquid to be dispensed, whereby said rear surface coacts with stray liquid on said shank to resist contact of said stray liquid with said liquid droplet.

20. The combination of claim 19, wherein:

said shank surface is wettable by said liquid to promote rearward migration of stray liquid from the shank.

21. The method of dispensing liquid to a liquid receiving means, comprising the steps of:

feeding said liquid to a liquid dispensing orifice at a controlled feed rate to form a liquid droplet at said orifice, effecting relative movement of said orifice and receiving means in a manner such that the relative movement of said receiving means with respect to said orifice occurs along a path transverse to the axis of said orifice and intersecting said droplet, whereby said receiving means undergoes relative movement past and in wiping contact with said droplet to effect liquid transfer from said droplet to said receiving means, and circumferentially contacting said droplet about said orifice with a convex, toroidal surface which is nonwettable by said liquid, whereby lateral displacement of said droplet from a centered symmetrical configuration relative to said orifice creates within said droplet unbalanced pressure forces which tend to restore said droplet to said centered configuration and thereby resist lateral displacement of said droplet due to said relative movement of said receiving means past and in wiping contact with said droplet.

22. The method of claim 21, wherein:

said liquid is oil, and said receiving means is a rotary roller bearing including bearing rollers which undergo relative rotation past and in wiping contact with the oil droplet on said delivery head.

* * * * *

UNITED STATES PATENT OFFICE
CERTIFICATE OF CORRECTION

PATENT NO. : 4,187,930
DATED : February 12, 1980
INVENTOR(S) : Gordon E. James

It is certified that error appears in the above-identified patent and that said Letters Patent are hereby corrected as shown below:

Column 4, line 15 "belloWs" should be cancelled and --bellows-- substituted therefor.

Columns 7 and 8, lines 67, 68 and 1, 2, and 3 respectively the table should be cancelled and the following table inserted therefor.

$\ell = 0.128"$ $d_1 = 0.07"$ $d_2 = 0.032"$ $d_3 = 0.02"$ $d_4 = 0.019"$

Signed and Sealed this

Thirteenth Day of May 1980

[SEAL]

Attest:

SIDNEY A. DIAMOND

Attesting Officer

Commissioner of Patents and Trademarks